(12) United States Patent
Dyer et al.

(10) Patent No.: US 10,579,788 B2
(45) Date of Patent: Mar. 3, 2020

(54) RECOGNIZING ASSIGNED PASSENGERS FOR AUTONOMOUS VEHICLES

(71) Applicant: Waymo LLC, Mountain View, CA (US)

(72) Inventors: John Wesley Dyer, Los Altos, CA (US); Luis Torres, San Francisco, CA (US); Michael Epstein, Danville, CA (US); Yu-Hsin Chen, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 165 days.

(21) Appl. No.: 15/679,485

(22) Filed: Aug. 17, 2017

(65) Prior Publication Data
US 2019/0057209 A1 Feb. 21, 2019

(51) Int. Cl.
*G06F 21/44* (2013.01)
*H04L 29/08* (2006.01)
*B60R 21/015* (2006.01)
*G08B 13/196* (2006.01)
*G06K 9/00* (2006.01)

(52) U.S. Cl.
CPC ........ *G06F 21/44* (2013.01); *B60R 21/01538* (2014.10); *G06K 9/00369* (2013.01); *G08B 13/19647* (2013.01); *H04L 67/12* (2013.01); *H04L 2209/84* (2013.01)

(58) Field of Classification Search
CPC ..... G06F 21/44; H04L 67/12; H04L 2209/84; B60R 21/01538; G06K 9/00369; G06K 9/00791; G06Q 10/04; G08B 1/19647
See application file for complete search history.

(56) References Cited

U.S. PATENT DOCUMENTS

| 6,356,838 B1 | 3/2002 | Paul |
| 6,414,635 B1 | 7/2002 | Stewart et al. |
| 6,545,601 B1 | 4/2003 | Monroe |

(Continued)

OTHER PUBLICATIONS

Nina Brouwer, Horst Kloeden and Christoph Stiller "Comprison and evaluation of pedestrian motion models for vehicle safety systems", IEEE, 2016, 2207-2212 (Year: 2016).*

(Continued)

*Primary Examiner* — Catherine Thiaw
(74) *Attorney, Agent, or Firm* — Botos Churchill IP Law

(57) ABSTRACT

Aspects of the disclosure provide systems and methods for recognizing an assigned passenger. For instance, dispatching instructions to pick up a passenger at a pickup location are received. The instructions include authentication information for authenticating a client computing device associated with the passenger. A vehicle is maneuvered in an autonomous driving mode towards the pickup location. The client device is then authenticated. After authentication, a set of pedestrians within a predetermined distance of the vehicle are identified from sensor information generated by a sensor of the vehicle and location information is received over a period of time from the client device. The received location information is used to estimate a velocity of the passenger. This estimated velocity is used to identify a subset of set of pedestrians that is likely to be the passenger. The vehicle is stopped to allow the passenger to enter the vehicle based on the subset.

20 Claims, 11 Drawing Sheets

(56) References Cited

U.S. PATENT DOCUMENTS

| | | | |
|---|---|---|---|
| 6,812,851 B1 | 11/2004 | Dukach et al. | |
| 7,920,071 B2 | 4/2011 | Baillot | |
| 8,346,426 B1 | 1/2013 | Szybalski et al. | |
| 8,547,249 B2* | 10/2013 | David | G08G 1/166 340/435 |
| 9,020,533 B1 | 4/2015 | Mangiardi et al. | |
| 9,194,168 B1* | 11/2015 | Lu | E05F 15/70 |
| 9,429,947 B1 | 8/2016 | Wengreen et al. | |
| 9,436,180 B1 | 9/2016 | Fredinburg et al. | |
| 9,547,307 B1 | 1/2017 | Cullinane et al. | |
| 9,551,992 B1 | 1/2017 | Barton-Sweeney et al. | |
| 9,733,096 B2 | 8/2017 | Colijn et al. | |
| 9,910,438 B1 | 3/2018 | Arden et al. | |
| 9,963,106 B1 | 5/2018 | Ricci | |
| 2002/0028002 A1 | 3/2002 | Whited | |
| 2002/0038181 A1 | 3/2002 | Okude et al. | |
| 2002/0058517 A1 | 5/2002 | Furukawa et al. | |
| 2002/0075201 A1 | 6/2002 | Sauer et al. | |
| 2002/0183920 A1 | 12/2002 | Smith et al. | |
| 2003/0096621 A1* | 5/2003 | Jana | G08G 1/0104 455/456.1 |
| 2003/0125845 A1 | 7/2003 | Carlstedt et al. | |
| 2003/0222794 A1 | 12/2003 | Vial | |
| 2004/0076280 A1 | 4/2004 | Ando et al. | |
| 2004/0102898 A1 | 5/2004 | Yokota et al. | |
| 2004/0128065 A1 | 7/2004 | Taylor et al. | |
| 2005/0018066 A1 | 1/2005 | Hofer | |
| 2005/0104745 A1 | 5/2005 | Bachelder et al. | |
| 2005/0114014 A1 | 5/2005 | Isaac | |
| 2005/0153707 A1 | 7/2005 | Ledyard et al. | |
| 2005/0225636 A1 | 10/2005 | Maemura et al. | |
| 2005/0231419 A1 | 10/2005 | Mitchell | |
| 2007/0197231 A1 | 8/2007 | Lin | |
| 2007/0279521 A1 | 12/2007 | Cohen | |
| 2008/0225137 A1 | 9/2008 | Kubo et al. | |
| 2008/0270204 A1 | 10/2008 | Poykko et al. | |
| 2008/0275645 A1 | 11/2008 | Hoshino | |
| 2009/0156241 A1 | 6/2009 | Staffaroni et al. | |
| 2009/0192851 A1 | 7/2009 | Bishop | |
| 2009/0234573 A1 | 9/2009 | Notarantonio | |
| 2009/0326991 A1 | 12/2009 | Wei et al. | |
| 2010/0194596 A1 | 8/2010 | Wang et al. | |
| 2010/0217613 A1 | 8/2010 | Kelly | |
| 2010/0228574 A1 | 9/2010 | Mundinger et al. | |
| 2010/0241349 A1 | 9/2010 | Wu | |
| 2010/0265048 A1 | 10/2010 | Lu et al. | |
| 2010/0293030 A1 | 11/2010 | Wu | |
| 2010/0332133 A1 | 12/2010 | Harris et al. | |
| 2011/0050463 A1 | 3/2011 | Yu et al. | |
| 2011/0053642 A1 | 3/2011 | Lee | |
| 2011/0059693 A1 | 3/2011 | O'Sullivan | |
| 2011/0068954 A1 | 3/2011 | McQuade et al. | |
| 2011/0099040 A1 | 4/2011 | Felt et al. | |
| 2011/0216200 A1 | 9/2011 | Chung et al. | |
| 2011/0313594 A1 | 12/2011 | Kato et al. | |
| 2011/0313880 A1 | 12/2011 | Paul et al. | |
| 2012/0041675 A1 | 2/2012 | Juliver et al. | |
| 2012/0109694 A1 | 5/2012 | Lee et al. | |
| 2012/0130627 A1 | 5/2012 | Islam et al. | |
| 2012/0154591 A1 | 6/2012 | Baur et al. | |
| 2012/0191269 A1 | 7/2012 | Chen et al. | |
| 2012/0277952 A1 | 11/2012 | MacNeille et al. | |
| 2013/0046456 A1 | 2/2013 | Scofield et al. | |
| 2013/0061044 A1 | 3/2013 | Pinkus et al. | |
| 2013/0144660 A1 | 6/2013 | Martin | |
| 2013/0149998 A1 | 6/2013 | Yi et al. | |
| 2013/0204463 A1 | 8/2013 | Chiappetta | |
| 2013/0211916 A1 | 8/2013 | Putman | |
| 2013/0218647 A1 | 8/2013 | Kroll et al. | |
| 2013/0286206 A1 | 10/2013 | Ozaki et al. | |
| 2013/0289858 A1 | 10/2013 | Mangiat et al. | |
| 2014/0038640 A1* | 2/2014 | Wesselius | G08G 1/202 455/456.1 |
| 2014/0051465 A1 | 2/2014 | Ruys et al. | |
| 2014/0172727 A1 | 6/2014 | Abhyanker et al. | |
| 2014/0200739 A1 | 7/2014 | Kirsch | |
| 2014/0300449 A1 | 10/2014 | Kounavis | |
| 2014/0365250 A1 | 12/2014 | Ikeda et al. | |
| 2015/0032328 A1 | 1/2015 | Healey et al. | |
| 2015/0081362 A1 | 3/2015 | Chadwick et al. | |
| 2015/0142484 A1 | 5/2015 | Huang et al. | |
| 2015/0154810 A1 | 6/2015 | Tew et al. | |
| 2015/0161554 A1 | 6/2015 | Sweeney et al. | |
| 2015/0175072 A1 | 6/2015 | Sabeti | |
| 2015/0199619 A1 | 7/2015 | Ichinose et al. | |
| 2015/0220791 A1 | 8/2015 | Wu et al. | |
| 2015/0302342 A1 | 10/2015 | Yeh | |
| 2015/0337587 A1 | 11/2015 | Lu et al. | |
| 2015/0338849 A1 | 11/2015 | Nemec et al. | |
| 2015/0339923 A1 | 11/2015 | Konig et al. | |
| 2015/0346727 A1 | 12/2015 | Ramanujam | |
| 2016/0021154 A1 | 1/2016 | Schoeffler | |
| 2016/0027307 A1* | 1/2016 | Abhyanker | G08G 1/005 701/117 |
| 2016/0048831 A1* | 2/2016 | Ongchin | G06Q 20/3821 705/44 |
| 2016/0161266 A1 | 6/2016 | Crawford et al. | |
| 2016/0167653 A1 | 6/2016 | Malone et al. | |
| 2016/0231746 A1 | 8/2016 | Hazelton et al. | |
| 2016/0261604 A1 | 9/2016 | Pal et al. | |
| 2017/0003687 A1 | 1/2017 | Kojo et al. | |
| 2017/0153714 A1 | 6/2017 | Gao et al. | |
| 2017/0213165 A1 | 7/2017 | Stauffer et al. | |
| 2017/0286884 A1 | 10/2017 | Shoval et al. | |
| 2017/0294130 A1* | 10/2017 | Donnelly | G08G 1/202 |
| 2017/0323398 A1* | 11/2017 | Dintenfass | G06Q 40/06 |
| 2017/0327082 A1* | 11/2017 | Kamhi | B60H 1/00735 |
| 2018/0075565 A1* | 3/2018 | Myers | G05D 1/0088 |
| 2018/0322775 A1* | 11/2018 | Chase | G05D 1/0088 |

OTHER PUBLICATIONS

International Search Report and Written Opinion for PCT Application No. PCT/US2018/031780, dated Jul. 16, 2018. 15 pages.

Böse, et al., "Autonomously controlled storage management in vehicle logistics—applications of RFID and mobile computing systems", International Journal of RF Technologies: Research and Applications 2008, iFirst Article, pp. 1-20.

C. Brownell, "Shared Autonomous Taxi Networks: An Analysis of Transportation Demand in NJ and a 21st Century Solution for Congestion," BS thesis. Princeton University, Princeton, NJ, 2013.

International Search Report and Written Opinion for PCT Application No. PCT/US2018/045137, dated Nov. 28, 2018. 12 pages.

* cited by examiner

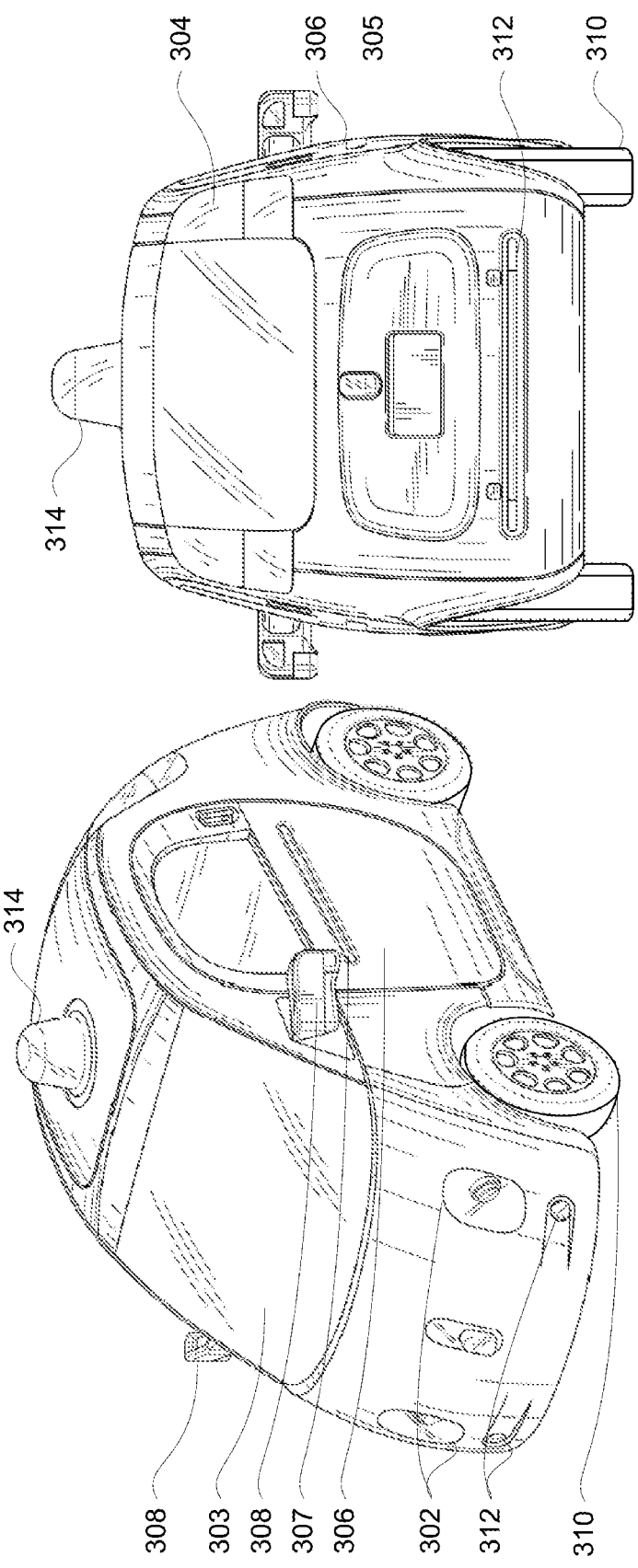

RECOGNIZING ASSIGNED PASSENGERS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In many cases, the human driver and the user are able to arrange an exact location for the user to be picked up. In addition, drivers and users are able to "flag down" one another, use eye contact, speak to one another, or other signals to indicate recognition of one another and thereby agree to some location prior to the vehicle reaching the exact location for the pickup. This is not readily achievable in the case of autonomous vehicles which do not have a human driver.

BRIEF SUMMARY

One aspect of the disclosure provides a method of recognizing an assigned passenger. The method includes receiving, by one or more processors of a vehicle, dispatching instructions to pick up the assigned passenger at a pickup location, the dispatching instructions including authentication information for a client computing device associated with the assigned passenger; maneuvering, by the one or more processors, the vehicle towards the pickup location in an autonomous driving mode; authenticating, by the one or more processors, the client computing device using the authentication information; after authenticating the client computing device, identifying, by the one or more processors, from sensor information generated by a sensor of the vehicle a set of pedestrians within a predetermined distance of the vehicle; after authenticating the client computing device, receiving, by the one or more processors, information from the client computing device identifying locations of the client computing device over a period of time; using, by the one or more processors, the received information to estimate a velocity of the client computing device; using, by the one or more processors, the estimated velocity to identify a subset of set of pedestrians that is likely to be the assigned passenger; and stopping, by the one or more processors, the vehicle to allow the assigned passenger to enter the vehicle based on the subset.

In another example, the received information includes orientation information generated by a sensor of the client computing device. In this example, the method also includes determining an orientation of each pedestrian of the set of pedestrians, comparing the orientation information with the determined orientations, and the comparison is further used to identify the subset. In another example, the method also includes using the sensor information to detect a gaze direction for each pedestrian of the set of pedestrians, and the gaze detection for each pedestrian is further used to identify the subset. In another example, the method also includes using the sensor information determine a number of other pedestrians corresponding to pedestrians within a predetermined distance of each pedestrians of the set of pedestrians, and wherein the determined number of other pedestrians within the predetermined distance of each pedestrian is further used to identify the subset. In this example, the dispatching instructions further identify a number of passengers, and wherein the identified number of passengers is further used to identify the subset. In another example, the set of pedestrians is updated as additional location information is received from the client computing device. In another example, stopping the vehicle includes stopping the vehicle closer to a pedestrian of the subset than the pickup location. In another example, stopping the vehicle includes stopping the vehicle before the vehicle reaches the pickup location. In another example, the method also includes using the sensor information to identify a characteristic that is different between two or more pedestrians of the set of pedestrians; sending a request to the client device, the request including a question regarding the characteristic; and receiving a response from the client computing device, and wherein the response is further used to identify the subset. In another example, using the estimated velocity to identify a subset of the set of pedestrians that is likely to be the assigned passenger includes inputting the estimated velocity into a model in order to identify a likelihood that each pedestrian of the set of pedestrians is the assigned passenger, and the likelihood that each pedestrian of the set of pedestrians is the passenger is further used to identify the subset.

Another aspect of the disclosure provides a system for recognizing an assigned passenger. The system includes one or more processors configured to receive dispatching instructions to pick up a passenger at a pickup location, the dispatching instructions including authentication information for a client computing device associated with the assigned passenger; maneuver a vehicle towards the pickup location in an autonomous driving mode; authenticate the client computing device using the authentication information; after authenticating the client computing device, identify from sensor information generated by a sensor of the vehicle a set of pedestrians corresponding to pedestrians within a predetermined distance of the vehicle; after authenticating the client computing device, receive location information from the client computing device over a period of time; receive information from the client computing device identifying locations of the client computing device over a period of time; use the received information to estimate a velocity of the client computing device; use the estimated velocity to identify a subset of the set of pedestrians that is likely to be the passenger; and stop the vehicle to allow the passenger to enter the vehicle based on the subset.

In one example, the received information includes orientation information generated by a sensor of the client computing device, and the one or more processors are further configured to determine an orientation of the passenger and compare the orientation information with the determined orientation, and wherein the comparison is further used to identify the subset. In another example, the one or more processors are further configured to use the sensor information to detect a gaze direction for each pedestrian of the set of pedestrians, and wherein the gaze detection for each pedestrian is further used by the one or more processors to identify the subset. In another example, the one or more processors are further configured to use the sensor information determine a number of other objects corresponding to pedestrians within a predetermined distance of each pedestrians of the set of pedestrians, and the determined number of other pedestrians within the predetermined distance of each pedestrian is further used by the one or more processors to identify the subset. In this example, the dispatching instructions further identify a number of passengers, and the identified number of passengers is further used by the one or more processors to identify the subset. In another example, the set of pedestrians is updated as additional location information is received from the client computing device. In another example, stopping the vehicle includes stopping the vehicle closer to a pedestrian of the subset than the pickup location. In another example, stopping the vehicle includes stopping the vehicle before the vehicle reaches the pickup location. In another example, the one or more processors are further configured to use the sensor information to identify a characteristic that is different between two or more pedestrians of the set of pedestrians; send a request to the client device, the request including a question regarding the characteristic; and receive a response from the client computing device, and wherein the response is further used to identify the subset. In another example, the system also includes the vehicle.

BRIEF DESCRIPTION OF THE DRAWINGS

FIGS. 3A-3D are example external views of a vehicle in accordance with aspects of the disclosure.

DETAILED DESCRIPTION

Overview

Figure 1:
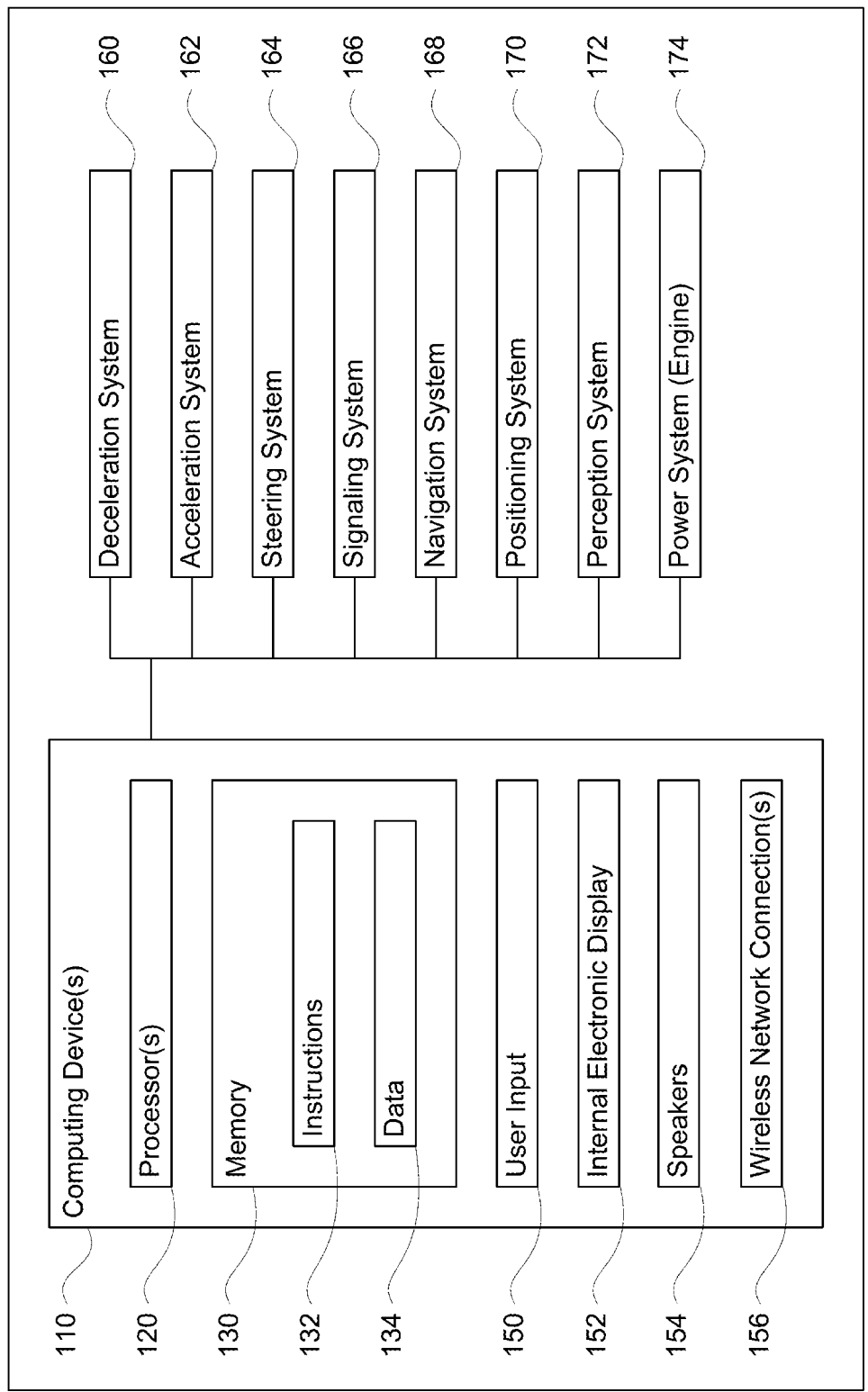
FIG. 1 is a functional diagram of an example vehicle in accordance with aspects of the disclosure.

Passenger pick-up for self-driving vehicles can be challenging due to the difficulties involved in having the computing devices of such vehicles recognize a particular person as being a passenger assigned to that vehicle. For example, using the vehicle GPS and GPS information generated by the person's client device (for instance, cell phone) is a common approach. However, because the GPS information generated by today's cell phones is fairly inaccurate, especially in cities, for instance being a hundred feet or more off, and because of high latency times for sending information from the client device to the vehicle's computing systems, this information alone can be insufficient. Moreover, without more, recognizing a particular person in a crowd can be very difficult for a computing device. In order to increase the accuracy and speed with which the computer recognizes a particular person, additional signals may be used.

Once the vehicle is within a predetermined distance in time or space from the pickup location, the computing devices may attempt to authenticate an assigned passenger's client devices. Once authentication has occurred, the computing devices may receive information from the client device such as GPS information as well as information from the client device's accelerometer or gyroscope regarding the orientation, heading, and/or estimated speed of movement of the client device may be sent to the computing devices.

At the same time, the computing devices may begin analyzing information received from the vehicle's perception system to identify additional signals. For instance, the vehicle may identify a set of any objects corresponding to pedestrians within a predetermined distance of the vehicle. For any such objects or pedestrians, the vehicle may begin determining specific characteristics of those pedestrians.

The computing devices may then begin comparing the information received from the client device with the characteristics of each identified pedestrian. The computing devices may process the GPS information to determine an estimated velocity of the passenger and compare this to the velocity of each pedestrian. This and other information discussed further below may be used to narrow down the set of pedestrians likely to be the assigned passenger to only a few or one.

This set of pedestrians may then be updated as the vehicle moves towards the pickup location. In addition, the set may be used to determine where the vehicle should stop as it may be easier to find a spot to stop that is closer to the one or more pedestrians of the set rather than continuing to the pickup location. Where the set includes only one pedestrian (or a few pedestrians who are very close to one another), the computing devices may even determine whether it is safe to stop in a lane, rather than pulling over to a parking spot or area, and allow the passenger to enter.

The features described above, may allow computing devices of an autonomous vehicle to more easily recognize a particular pedestrian as a passenger assigned to that vehicle. This enables the computing devices to be more responsive to a passenger's current location circumstances, and may even allow the computing devices to find more convenient and better places to stop for the passenger to enter or exit. For instance, when a pedestrians position and circumstances indicate that he or she can get into the vehicle quickly, stopping in a lane may be a safe and efficient choice as the vehicle would not be stopped for long and stopping in a lane may be preferable when parking is either unavailable or very far away. Finding more convenient and better places to stop for the passenger to enter or exit, may save the passenger time and effort to reach the vehicle, for instance, by reducing an amount of walking the passenger must do to reach the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location.

In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 2:
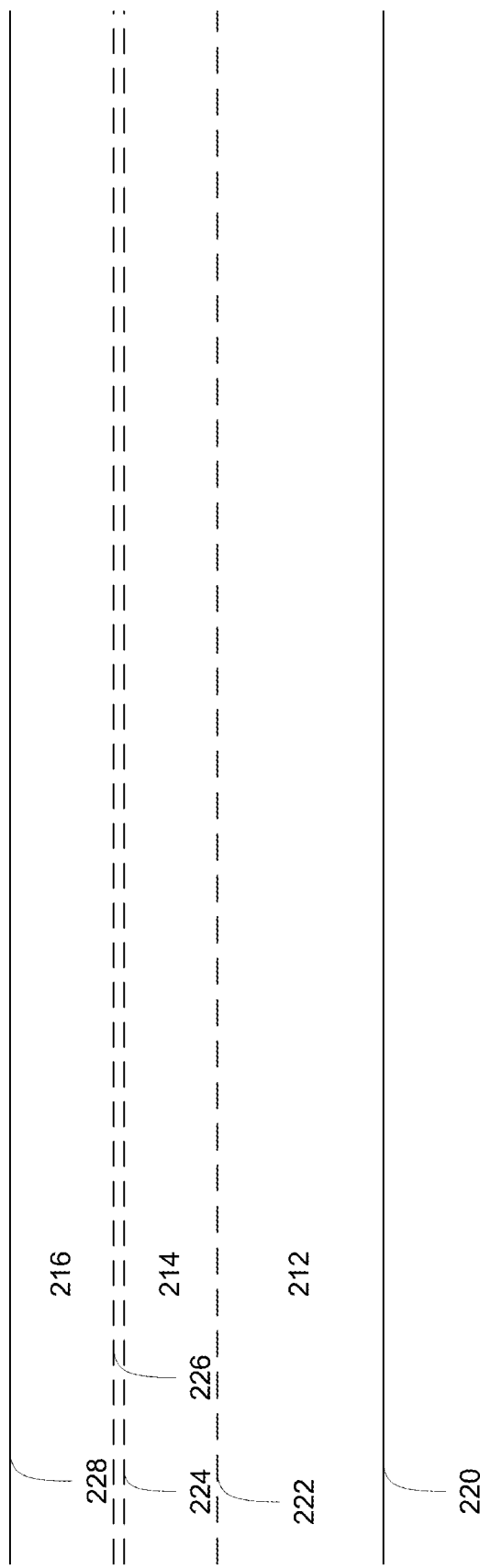
FIG. 2 is an example representation of detailed map information in accordance with aspects of the disclosure.
Figure 3A:
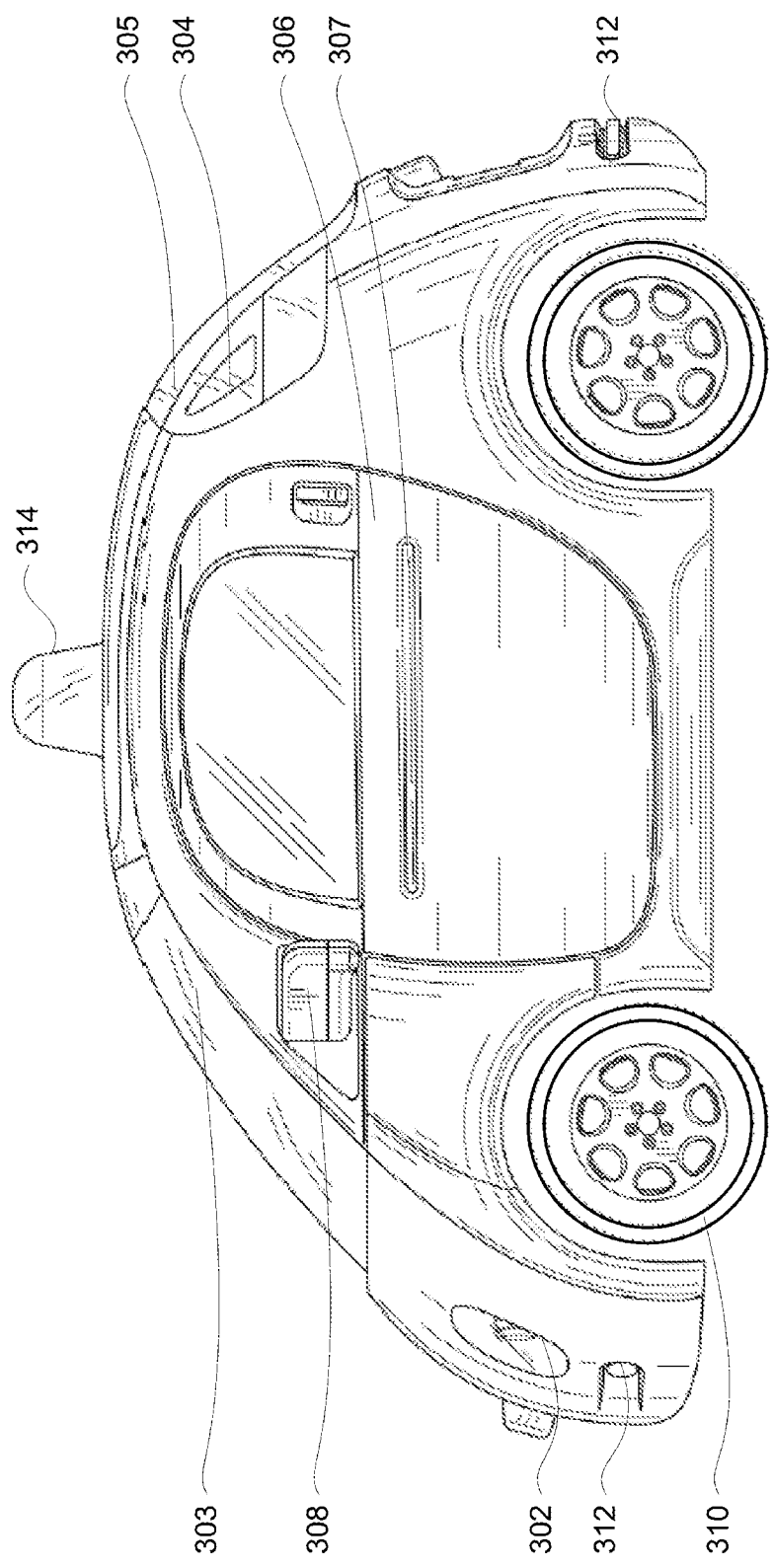
Figure 3D:
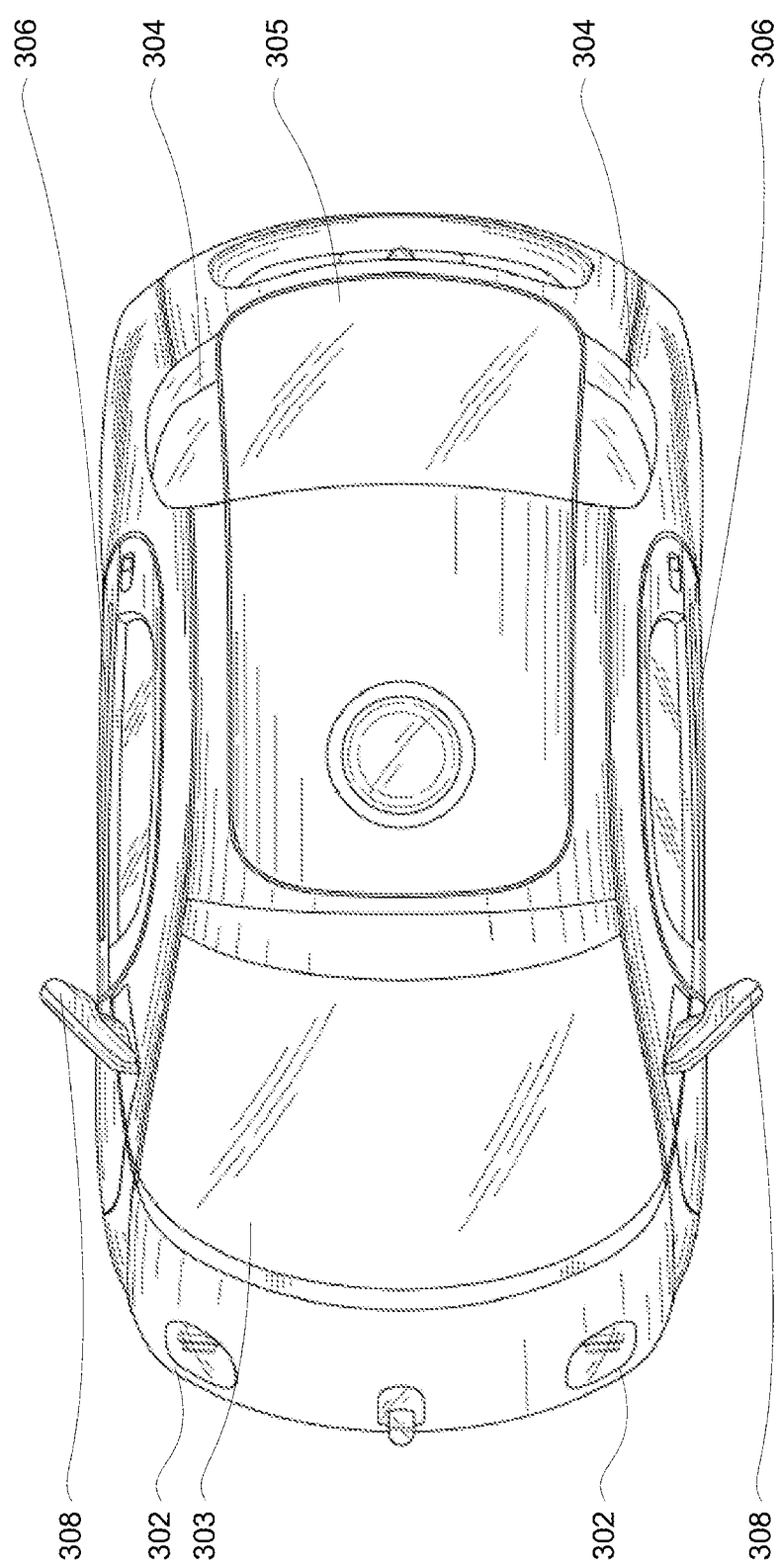

FIG. 2 is an example of map information 200 for a section of roadway 210. The map information 200 includes information identifying the shape, location, and other characteristics of various road features. In this example, the map information includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of roadway 210, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Figure 4:
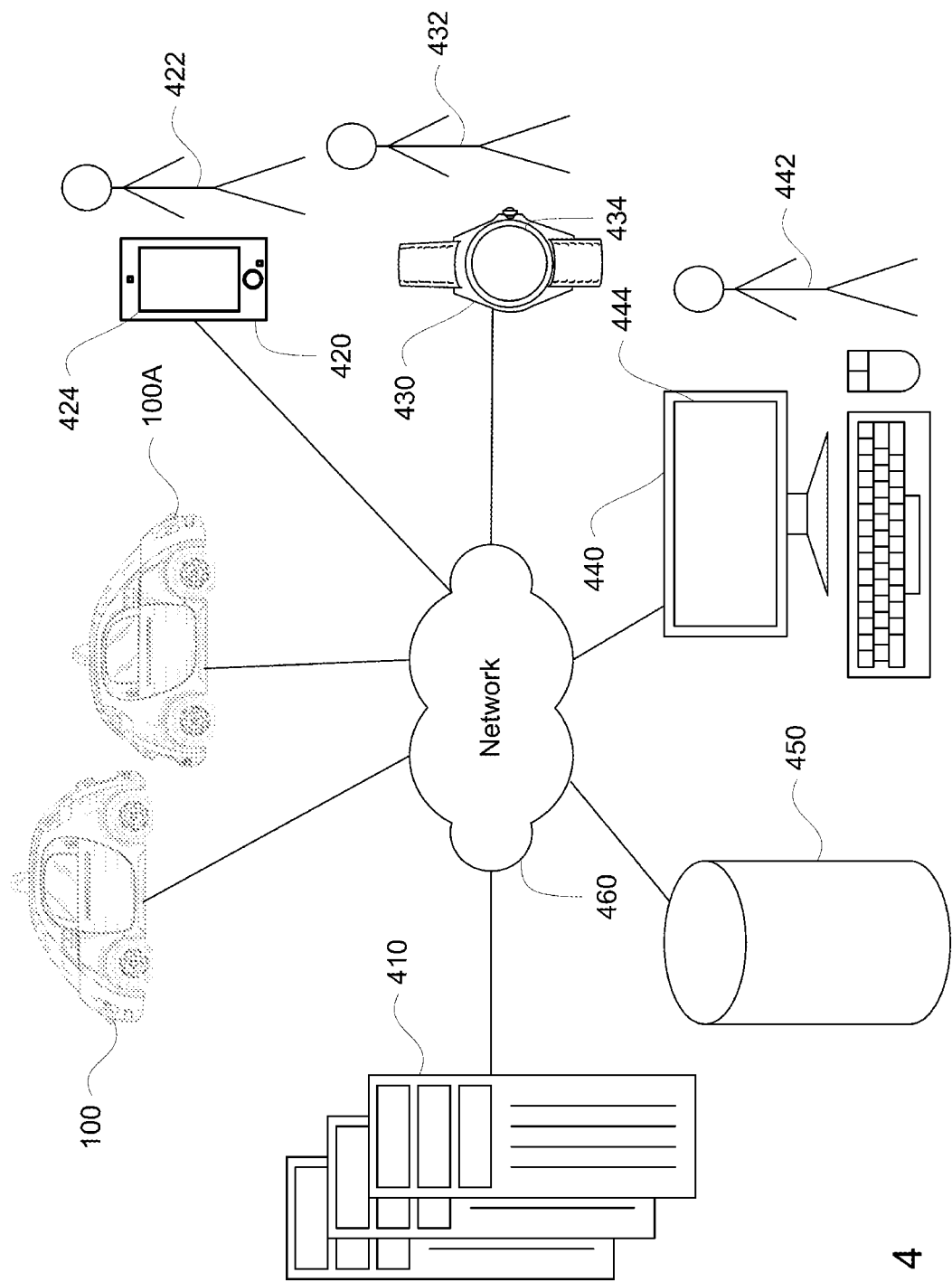
FIG. 4 is an example pictorial diagram of a system in accordance with aspects of the disclosure.
Figure 5:
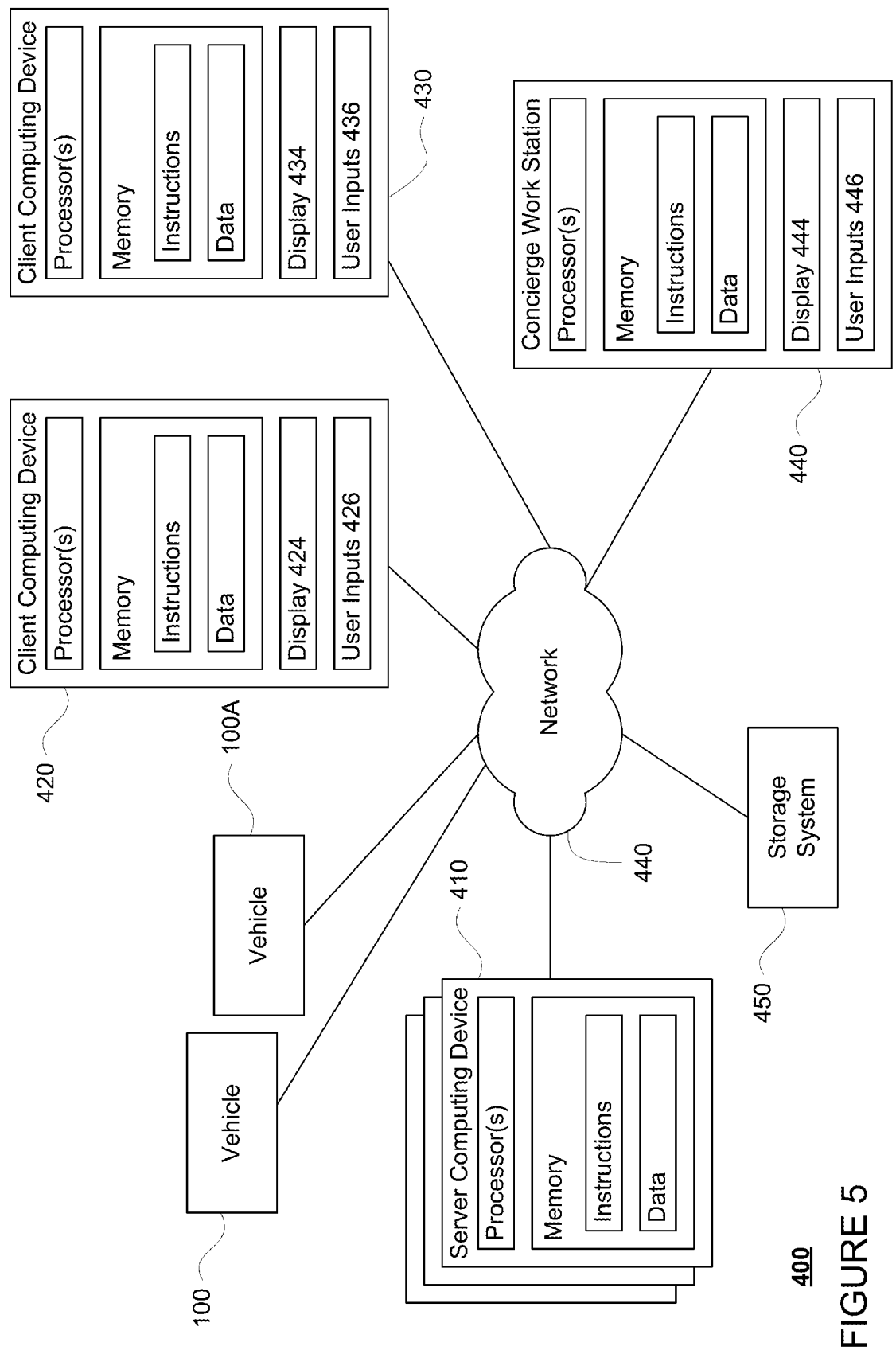
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH (R), Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH (R), Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 250 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be defaulted to the current location of the user's client computing device, or can be input by the user at the user's client device. For instance, the user may enter an address or other location information or select a location on a map to select a pickup location. Once the user has selected one or more of a pickup and/or destination locations, the client computing device 420 may send the location or locations to one or more server computing devices of the centralized dispatching system. In response, one or more server computing devices, such as server computing device 410, may select a vehicle, such as vehicle 100, for instance based on availability and proximity to the user. The server computing device 410 may then assign the user as the passenger for the vehicle 100, dispatch the selected vehicle (here vehicle 100) to pick up to the assigned passenger. This may include by providing the vehicle's computing devices 110 with the pickup and/or destination locations specified by the assigned passenger as well as information that can be used by the computing devices 110 of vehicle 100 to authenticate the client computing device, such as client computing device 430.

Figure 6:
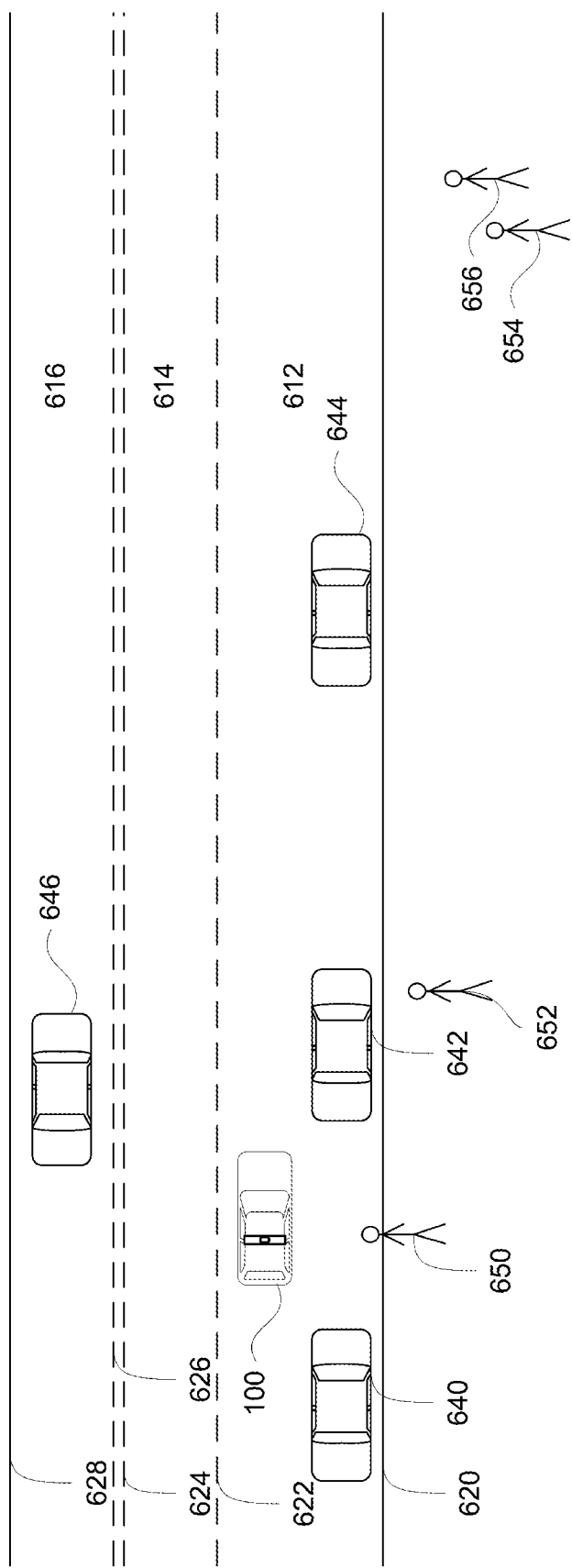
FIG. 6 is a view of a section of roadway in accordance with aspects of the disclosure.

FIG. 6 is an example view of vehicle 100 driving along a roadway 610 corresponding to roadway 210 of FIG. 2. In that regard, lanes 612, 614, 616 correspond to the shape and location of lanes 212, 214, 216, curbs 620, 628 correspond to the shape and location of curb 220, and lane lines 622, 624, 626 correspond to the shape and location of lane lines 222, 224, 226, and curb 228. In this example, vehicle 100 is traveling in lane 612. Vehicles 640, 642, and 644 are parked within lane 612 along curb 620, while vehicle 646 is moving in lane 616. Pedestrians 650, 652, 654, 656 are located around roadway 210, but within the range of the sensors of the perception system 172.

Figure 7:
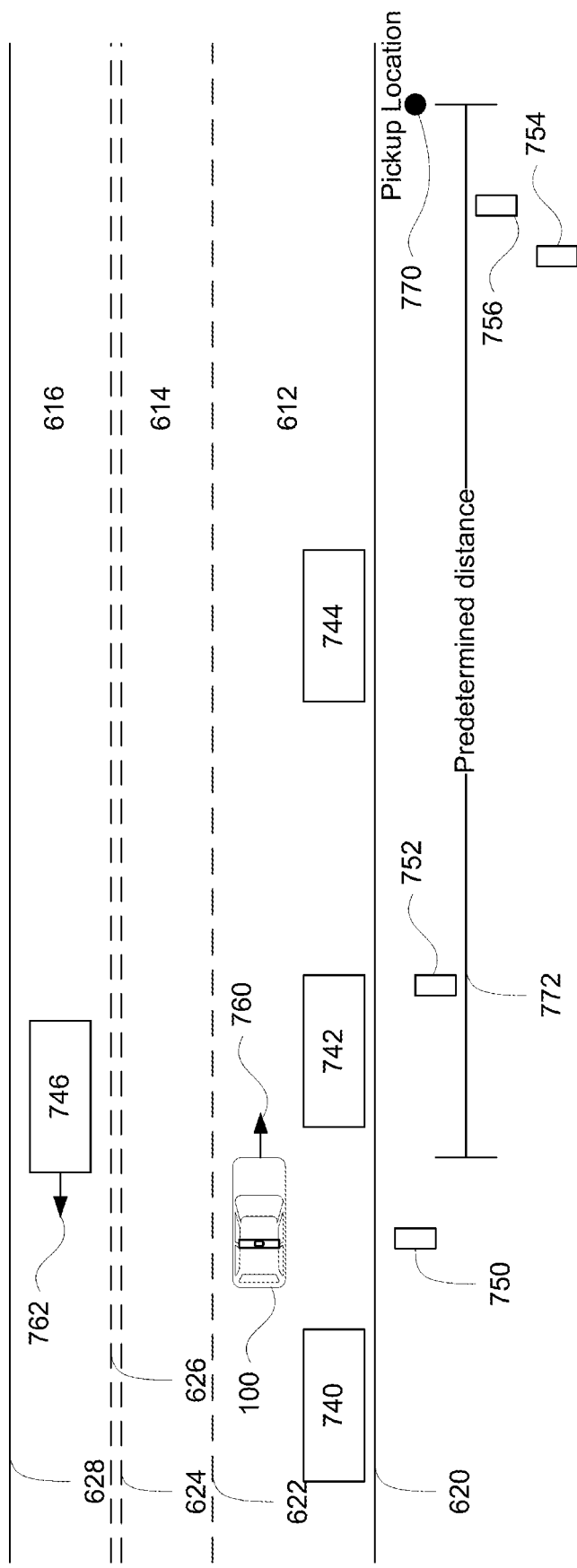
FIG. 7 is an example of sensor data for the section of roadway and other information in accordance with aspects of the disclosure.

As the vehicle moves along lane 612, the perception system 172 provides the computing devices with sensor data regarding the shapes and location of objects, such as curbs 620, 628, lane lines 622, 624, 624, as well as vehicles 640, 642, 644, 646. FIG. 7 depicts sensor data perceived by the various sensors of the perception system 172 when vehicle 100 is in the situation as depicted in FIG. 6 in combination with other information available to the computing devices 110. In this example, vehicles 640, 642, 644, 646, are represented by bounding boxes for objects 740, 742, 744, 746 as provided by the perception system 172 to the computing devices 110. Pedestrians 650, 652, 654, 656 are also represented by bounding boxes 750, 752, 754, 756 (hereafter pedestrians for simplicity). Of course, these bounding boxes represent merely a volume of space within which data points corresponding to an object are at least approximately bounded within. In addition, the actual heading of vehicle 100 and estimated heading of bounding box 746 are represented by arrows 760 and 762, respectively. As bounding boxes 740, 742, 744 appear to be moving very slowly or not at all, the computing devices 110 may determine that the objects represented by these bounding boxes are parked along curb 620.

Once the vehicle is within a predetermined distance in time or space from the pickup location, such as sometime before or after the vehicle's computing devices should begin looking for a place to stop and/or park the vehicle and an assigned passenger's client devices has been authenticated by the vehicle. As an example, this distance may be 50 meters, 50 feet, or more or less from the pickup location. For instance, using near-field communication, BLUETOOTH (R) or other wireless protocols, the computing devices may attempt to communicate and establish a link with the client device. When this link is successfully established, the client device can be authenticated.

For instance, returning to FIG. 7, vehicle 100 has just reached the predetermined distance 772 from pickup location 770. At this point, vehicle 100 will attempt to authenticate the client device of the assigned passenger using the information received from the server computing devices 410. In this regard, the computing devices 110 and 430 may be capable of direct communication of information (i.e. without the need for the information to be relayed by the server computing devices 410).

Once authentication has occurred, the computing devices may receive information from the client device as noted above. The information received by the computing devices 110 from the client computing device 430 may include information from the client computing device's 430 accelerometer or gyroscope regarding the orientation and/or heading of the client computing device. In addition, the computing devices 110 may receive GPS or other location information from the client computing device 430.

At the same time, the computing devices may begin analyzing information received from the vehicle's perception system to identify additional signals. For instance, the computing devices 110 may receive information from the perception system 172 identifying any pedestrians within the range of the sensors of the perception system 172. This may include the location and other characteristics such as velocity and orientation of objects 750-756 corresponding to pedestrians The computing devices may then identify a set of all such pedestrians within a predetermined distance of the vehicle, such as 50 meters or more or less or those that are within a predetermined distance of the pickup location, such as 50 meters or more or less. Accordingly, in the example of FIG. 8, the computing devices 110 may identify all of objects 750-756 as being within the predetermined distance.

For any such identified objects or pedestrians of the set, the computing devices 110 may begin determining specific characteristics of those pedestrians, such as relative pose (position and orientation or heading), velocity as well as a direction of gaze, as well as the number of other pedestrians within a predetermined distance (such as 2 meters or more or less) of each pedestrian. In some instances, the computing devices 110 may even classify pedestrians as more or less likely to be waiting for a vehicle. For instance, a person walking away from the vehicle's current location may be less like to be waiting than someone walking towards the vehicle. This can be used to filter certain pedestrians from the set which are very unlikely to be waiting for a vehicle and thereby reduce the amount of processing required by the comparisons described below.

Figure 8:
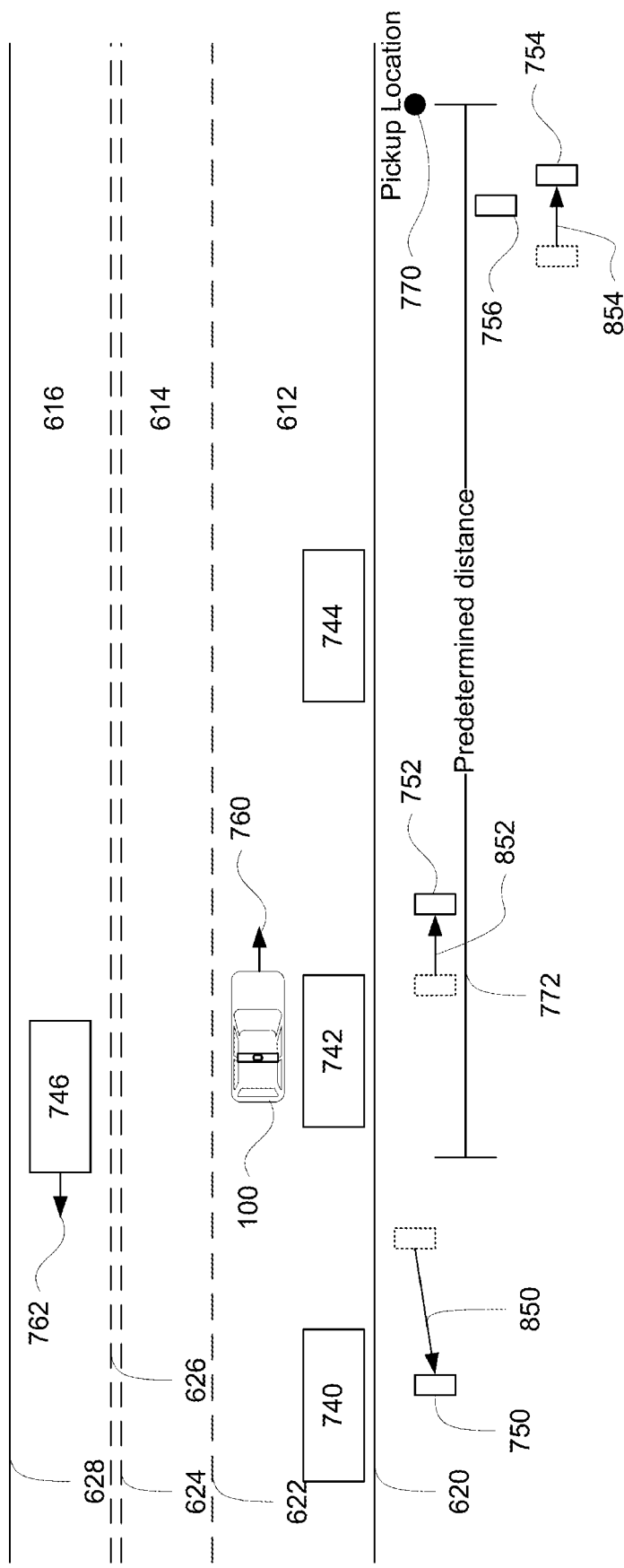
FIG. 8 is another example of sensor data for the section of roadway and other information in accordance with aspects of the disclosure.

For example, a brief period of time, such as a few seconds, has elapsed from the example FIG. 7 to the example of FIG. 8. As shown in FIG. 8, vehicle 100 has progressed towards the pickup location 770 and is now closer to pickup location 770 than in the example of FIG. 7. In addition, pedestrians 750, 752 and 754 have moved the distances and directions indicated by arrows 850, 852, and 854 respectively. Pedestrian 756 is stationary between the time of FIG. 8 and the time of FIG. 7. Using the change in this distance over the brief period of time may also provide an estimated velocity of these pedestrians For example, pedestrian 750 may be moving at approximately 5 meters per second in the direction of arrow 850, pedestrians 752 and 754 may be moving at approximately 2 meters per second in the direction of arrows 852 and 854, respectively, and pedestrian 756 may appear to be stationary. Of course, these determinations of velocity may be made by the computing devices 110 or by the perception system 172 and provided to the computing devices 110.

In addition, the computing devices 110 may also process the GPS or other location information received from the client computing device 430 to determine an estimated velocity of the assigned passenger or rather, the assigned passenger's client computing device. For instance, by plotting the changes in location over time, the computing devices 110 may determine an estimated velocity of the client computing device 430. The velocity estimate may include an estimated direction of the velocity. Although the GPS information may be somewhat unreliable, in some cases, the estimated velocity may actually be more reliable.

The computing devices 110 may then begin comparing the information received from the client computing device 430 with the characteristics of each pedestrian determined from the information from the perception system 172. This may be used to narrow down set of pedestrians to only a few or one. For instance, the estimated velocity of the client computing device 430 may be compared estimated velocities of each of the pedestrians For instance, if the estimated velocity of client computing device 430 is 2 meters per second in an estimated direction corresponding to the direction of arrow 760, pedestrians 752 and 754 may be more likely to be the passenger than pedestrians 750 which is moving at a greater velocity in a very different direction (as indicated by arrow 850). Thus, pedestrians 756 and 750 may be filtered from the set of possible pedestrians.

In addition, as noted above the GPS information received by the computing devices 110 from the client computing device 430 may be compared to the detected position of each of the identified pedestrians or pedestrians 750-756. Similarly, the accelerometer or heading information received from the client computing device 430 may be compared to the detected heading of each of the identified pedestrians. These additional comparisons may be used to further narrow the set of pedestrians.

Other signals, such as the orientation of the gaze of the pedestrian, may also be used to determine whether this is consistent with the accelerometer information (people generally look in the direction they are moving) and also whether it is consistent with a person looking at the vehicle (who is likely to be the passenger) or at his or her computing device (if they are checking the current location of the vehicle). For instance, pedestrian 750 may be filtered due to its distance from the pickup location 770 and because pedestrian 750 appears to be moving away from both the vehicle 100 and the pickup location 770. At the same time, pedestrians 752 and 754 are both moving toward the pickup location 770 and neither away from nor towards vehicle 100, making these pedestrians more likely to be the assigned passenger than pedestrian 750. In this example, pedestrian 752 may be looking in the direction of vehicle 100, which may make pedestrian 752 more likely to be the assigned passenger as well. Similarly, pedestrian 756 may be oriented towards and looking at the vehicle 100, which would again make it more likely that pedestrian 756 is the assigned passenger.

In addition, where the computing devices have been dispatched to pick up more than one person, the number of other pedestrians corresponding to pedestrians within a predetermined distance, such as 2 meters or more or less, if each pedestrian of the set may help to identify which of the pedestrians of the set is more likely to be the assigned passenger as he or she is likely to be with a group that is the same in number. Again, taking each of these signals into consideration, the computing devices may narrow down the observed pedestrian pedestrians to a very small (1 or 2 or more or less) set of pedestrians who are likely to be the assigned passenger. For instance, if the computing devices provide instructions to computing devices 110 indicating that two passengers will be picked up, then it may be more likely that pedestrian 754 is the passenger than pedestrian 752, as pedestrian 754 is close to another pedestrian (here pedestrian 756). Again, pedestrians may then be filtered or otherwise removed from the set accordingly.

The set may then be updated as the vehicle moves towards the pickup location. In addition, the set may be used to determine where the vehicle should stop as it may be easier to find a spot to stop that is closer to the one or more pedestrians of the set rather than continuing to the pickup location. Where the set includes only one pedestrian (or a few pedestrians that are very close to one another), the computing devices 110 may even determine whether it is safe to stop in a lane, rather than pulling over to a parking spot or area, and allow the passenger to enter. For instance, if the set includes only pedestrian 752, it may be more efficient for the computing devices 110 to pull the vehicle over behind or before passing the pedestrian 744 to stop and wait for the assigned passenger than it would be for the computing devices 110 to pull the vehicle over in after passing pedestrian 744. Similarly, if the set includes only pedestrian 754, it may be more efficient for the computing devices 110 to pull the vehicle over after passing pedestrian 744 to stop and wait for the assigned passenger than it would be for the computing devices 110 to pull the vehicle over behind or before passing pedestrian 744.

In some instances, the passenger may also be asked to assist the computing devices 110 in recognizing him or her. For instance, the passenger may be asked to share an image of the passenger in order to allow facial recognition or recognition of body shape and size. Similarly, the passenger may be asked to enter their own characteristics such as height and weight, clothing details (such as shirt color, pant color, or other characteristics). The passenger could also be asked to make some additional gesture, such as waiving or holding up or moving his or her client device in a particular way, displaying a particular color or code on a display his or her client device and orienting the display towards the vehicle. The passenger could also be asked specific questions in order to help the vehicle narrow down the set of pedestrians, such as "what color is your shirt?" or "is your shirt red?". In another alternative, images or characteristics of the passenger may be determined during one trip, and if the passengers selects to save this information for later trips, this information can be used by the computing devices to recognize the same passenger on a later trip. Again, all of this information may be used to identify a particular pedestrian as the passenger assigned to the vehicle.

In addition or alternatively, any of the signals discussed above to identify pedestrians for and/or filter pedestrians from the set could be applied probabilistically. For instance, the set could be populated by thresholding on the combined likelihoods for all the signals for each pedestrian corresponding to a pedestrian. The set could then be ranked based on the combined likelihoods. Higher or the highest ranking pedestrians would be considered more likely to be the assigned passenger. In this example, the vehicle may stop to wait for the pedestrian corresponding to a high ranking pedestrian when the combined likelihood is above a certain threshold and/or when the pedestrian corresponds to the highest ranking pedestrian.

The accuracy of recognizing a particular passenger may be increased by using machine learning techniques. For instance, a model of how likely a particular pedestrian is a passenger assigned to a vehicle may be generated by inputting the information received from client devices as well as the information detected by the perception system for various pedestrians Those that turn out to be the assigned passenger may be labeled as passengers, and those that turn out not to be the assigned passenger may be labeled as such. The output of the model may be the likelihood that each pedestrian is an assigned passenger. When the computing devices are inputting data for a set of pedestrians corresponding to pedestrians into the mode, the pedestrian of the set with the highest likelihood may be assigned to be the assigned passenger, such as in the probabilistic approach described above. Over time, as more information becomes available for different passengers and non-passenger pedestrians, the model may continue to be trained and used to identify whether a particular pedestrian is likely to be assigned to a vehicle.

As an alternative, rather than authenticating before attempting to identify an assigned passenger, once the vehicle is within the predetermined distance of the pickup location, the computing devices 110 may attempt to first identify the assigned passenger. This may be achieved using the examples described above or by using computer vision techniques to authenticate the assigned passenger (rather than communication with the assigned passenger's client computing device). Of course, this may be more complicated as information from the assigned passenger's client computing device would most likely be related to the server computing device before reaching the vehicle's computing devices.

Figure 9:
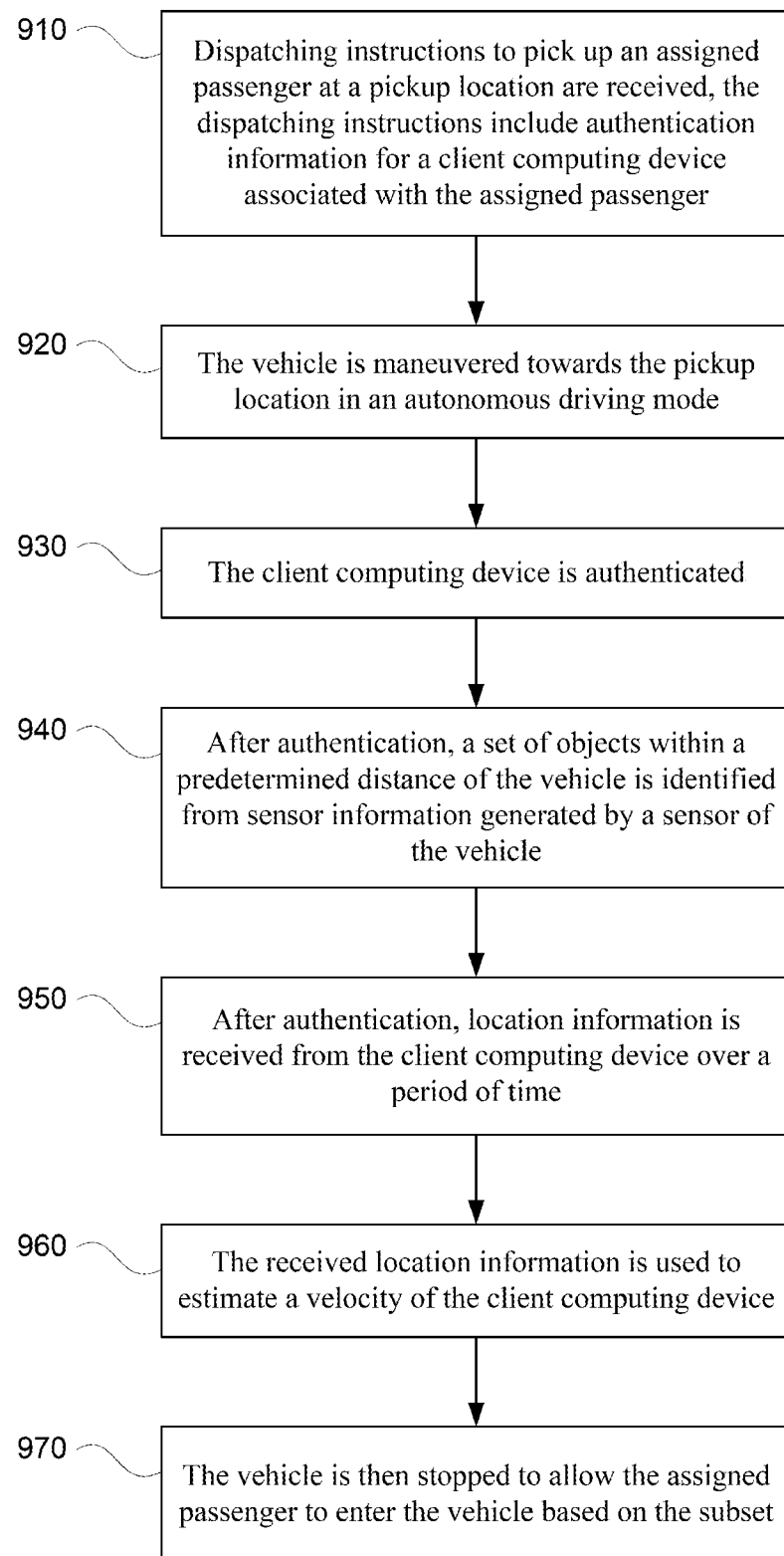
FIG. 9 is flow diagram in accordance with aspects of the disclosure.

FIG. 9 is a flow diagram 900 that may be performed by one or more processors such as one or more processors 120 of computing device 110. In this example, at block 910, dispatching instructions to pick up an assigned passenger at a pickup location. The dispatching instructions include authentication information for a client computing device associated with the assigned passenger. The vehicle is maneuvered towards the pickup location in an autonomous driving mode at block 920. The client computing device is authenticated using the authentication information at block 930. After the client computing device is authenticated, a set of pedestrians within a predetermined distance of the vehicle is identified from sensor information generated by a sensor of the vehicle at block 940, and location information is received from the client computing device over a period of time at block 950. The received location information is used to estimate a velocity of the client computing device at block 950. The estimated velocity is used to identify a subset of set of pedestrians that is likely to be the assigned passenger at block 960. The vehicle is then stopped to allow the assigned passenger to enter the vehicle based on the subset at block 970.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of recognizing an assigned passenger, the method comprising:
receiving, by one or more processors of a vehicle, dispatching instructions to pick up the assigned passenger at a pickup location, the dispatching instructions including authentication information for a client computing device associated with the assigned passenger;
maneuvering, by the one or more processors, the vehicle towards the pickup location in an autonomous driving mode;
authenticating, by the one or more processors, the client computing device using the authentication information;
after authenticating the client computing device, identifying, by the one or more processors, from sensor information generated by a sensor of the vehicle a set of pedestrians within a predetermined distance of the vehicle;
after authenticating the client computing device, receiving, by the one or more processors, information from the client computing device identifying location of the client computing device over a period of time;
using, by the one or more processors, the received information to estimate a velocity of the client computing device;
receiving, by the one or more processors, information indicative of the velocities of pedestrians within a set of pedestrians within a predetermined distance of the vehicle;
comparing, by the one or more processors, the estimated velocity of the client computing device to the information indicative of the velocities of the pedestrians and thereby identify a subset of the set of pedestrians that is likely to be the assigned passenger; and
stopping, by the one or more processors, the vehicle to allow the assigned passenger to enter the vehicle based on the identified subset.

2. The method of claim 1, wherein the received information includes orientation information generated by a sensor of the client computing device, and the method further includes:
determining an orientation of each pedestrian of the set of pedestrians; and
comparing the orientation information with the determined orientations, and wherein the comparison is further used to identify the subset.

3. The method of claim 1, further comprising using the sensor information to detect a gaze direction for each pedestrian of the set of pedestrians, and wherein the gaze detection for each pedestrian is further used to identify the subset.

4. The method of claim 1, further comprising using the sensor information determine a number of other pedestrians corresponding to pedestrians within a predetermined distance of each pedestrian of the set of pedestrians, and wherein the determined number of other pedestrians within the predetermined distance of each pedestrian is further used to identify the subset.

5. The method of claim 4, wherein the dispatching instructions further identify a number of passengers, and wherein the identified number of passengers is further used to identify the subset.

6. The method of claim 1, wherein the set of pedestrians is updated as additional location information is received from the client computing device.

7. The method of claim 1, wherein stopping the vehicle includes stopping the vehicle closer to a pedestrian of the subset than to the pickup location.

8. The method of claim 1, wherein stopping the vehicle includes stopping the vehicle before the vehicle reaches the pickup location.

9. The method of claim 1, further comprising:
using the sensor information to identify a characteristic that is different between two or more pedestrians of the set of pedestrians;
sending a request to the client device, the request including a question regarding the characteristic; and
receiving a response from the client computing device, and wherein the response is further used to identify the subset.

10. The method of claim 1, wherein using the estimated velocity to identify a subset of the set of pedestrians that is likely to be the assigned passenger includes inputting the estimated velocity into a model in order to identify a likelihood that each pedestrian of the set of pedestrians is the assigned passenger, and wherein the likelihood that each pedestrian of the set of pedestrians is the passenger is further used to identify the subset.

11. A system for recognizing an assigned passenger, the system comprising one or more hardware processors configured to:
receive dispatching instructions to pick up a passenger at a pickup location, the dispatching instructions including authentication information for a client computing device associated with the assigned passenger;
maneuver a vehicle towards the pickup location in an autonomous driving mode;
authenticate the client computing device using the authentication information;
after authenticating the client computing device, identify from sensor information generated by a sensor of the vehicle a set of pedestrians corresponding to pedestrians within a predetermined distance of the vehicle;
after authenticating the client computing device, receive location information from the client computing device over a period of time;
receive information from the client computing device identifying locations of the client computing device over a period of time;
use the received information to estimate a velocity of the client computing device;
receive information indicative of the velocities of pedestrians within a set of pedestrians within a predetermined distance of the vehicle:
compare the estimated velocity of the client computing device to the information indicative of the velocities of the pedestrians and thereby identify a subset of the set of pedestrians that is likely to be the passenger;
stop the vehicle to allow the passenger to enter the vehicle based on the identified subset.

12. The system of claim 11, wherein the received information includes orientation information generated by a sensor of the client computing device, and the one or more processors are further configured to:
determine an orientation of the passenger; and
compare the orientation information with the determined orientation, and wherein the comparison is further used to identify the subset.

13. The system of claim 11, wherein the one or more processors are further configured to use the sensor information to detect a gaze direction for each pedestrian of the set of pedestrians, and wherein the gaze detection for each pedestrian is further used by the one or more processors to identify the subset.

14. The system of claim 11, wherein the one or more processors are further configured to use the sensor information determine a number of other pedestrians corresponding to pedestrians within a predetermined distance of each pedestrians of the set of pedestrians, and wherein the determined number of other pedestrians within the predetermined distance of each pedestrian is further used by the one or more processors to identify the subset.

15. The system of claim 14, wherein the dispatching instructions further identify a number of passengers, and wherein the identified number of passengers is further used by the one or more processors to identify the subset.

16. The system of claim 11, wherein the set of pedestrians is updated as additional location information is received from the client computing device.

17. The system of claim 11, wherein stopping the vehicle includes stopping the vehicle closer to a pedestrian of the subset than to the pickup location.

18. The system of claim 11, wherein stopping the vehicle includes stopping the vehicle before the vehicle reaches the pickup location.

19. The system of claim 11, wherein the one or more processors are further configured to:
use the sensor information to identify a characteristic that is different between two or more pedestrians of the set of pedestrians;
send a request to the client device, the request including a question regarding the characteristic; and
receive a response from the client computing device, and wherein the response is further used to identify the subset.

20. The system of claim 11, further comprising the vehicle.

* * * * *